United States Patent
Kinoshita et al.

(10) Patent No.: US 9,252,408 B2
(45) Date of Patent: Feb. 2, 2016

(54) HEATER MODULE WIRE CONNECTION STRUCTURE FOR BATTERY PACK

(75) Inventors: Yukiko Kinoshita, Okegawa (JP); Naoto Todoroki, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 340 days.

(21) Appl. No.: 13/820,910

(22) PCT Filed: Feb. 28, 2012

(86) PCT No.: PCT/JP2012/054948
§ 371 (c)(1),
(2), (4) Date: Mar. 5, 2013

(87) PCT Pub. No.: WO2012/124470
PCT Pub. Date: Sep. 20, 2012

(65) Prior Publication Data
US 2013/0161310 A1     Jun. 27, 2013

(30) Foreign Application Priority Data
Mar. 11, 2011  (JP) .................................. 2011-054085

(51) Int. Cl.
*H05B 1/00*     (2006.01)
*H01M 2/10*    (2006.01)
(Continued)

(52) U.S. Cl.
CPC .......... *H01M 2/1077* (2013.01); *H01M 10/486* (2013.01); *H01M 10/5006* (2013.01);
(Continued)

(58) Field of Classification Search
CPC ...................... H01M 10/5081; H01M 10/5006; H01M 10/5051; H01M 10/486; H01M 10/5083; H01M 10/5016; H01M 10/625; H01M 10/615; H01M 10/6571; H01M 2/0777; H01M 2/1077; H01M 2220/20; H05B 3/26; H05B 3/22; H05B 3/06
See application file for complete search history.

(56) References Cited

U.S. PATENT DOCUMENTS 7,097,934 B2   8/2006  Shigeta et al.
7,964,827 B2   6/2011  Suzuki et al.
(Continued)

FOREIGN PATENT DOCUMENTS

| CN | 101589504 A | 11/2009 |
| JP | 2003-223938 A | 8/2003 |
| JP | 2008-186621 A | 8/2008 |
| JP | 2010-527110 A | 8/2010 |

OTHER PUBLICATIONS

Chinese Office Action dated Oct. 8, 2014, 6 pgs.

*Primary Examiner* — Shawntina Fuqua
(74) *Attorney, Agent, or Firm* — Foley & Lardner LLP (57) ABSTRACT

The heater module wire connection structure for a battery pack includes a battery pack (11), and first and second heater modules (22L, 23L) which warm the inside of the battery pack and have lead wires (44L, 45L) connected thereto. Further, the heater module wire connection structure includes a power supply cable (42) to which the lead wires of the first and second heater modules are crimped and connected, and a temperature sensor (43C) which is placed inside of the battery pack and detects the temperature of the first heater module (23L). The lead wire (45L) of the first heater module, the temperature of which is detectable by the temperature sensor, and the lead wire (44L) of the second heater module (22L), the temperature of which is not detectable by the temperature sensor, are simultaneously crimped and connected to the same position on the power supply cable.

5 Claims, 6 Drawing Sheets

(51) Int. Cl.
*H01M 10/6553* (2014.01)
*H01M 10/48* (2006.01)
*H01M 10/615* (2014.01)
*H01M 10/625* (2014.01)
*H01M 10/6571* (2014.01)

(52) U.S. Cl.
CPC ........ *H01M10/5051* (2013.01); *H01M 10/615* (2015.04); *H01M 10/625* (2015.04); *H01M 10/6571* (2015.04); *H01M 2220/20* (2013.01)

(56) References Cited

U.S. PATENT DOCUMENTS

| | | |
|---|---|---|
| 2003/0162084 A1 | 8/2003 | Shigeta et al. |
| 2008/0179315 A1 | 7/2008 | Suzuki et al. |
| 2008/0280198 A1 | 11/2008 | Kumar et al. |
| 2010/0297483 A1* | 11/2010 | Kawai .............................. 429/62 |

\* cited by examiner

HEATER MODULE WIRE CONNECTION STRUCTURE FOR BATTERY PACK

TECHNICAL FIELD

The present invention relates to a wire connection structure for connecting a plurality of heater modules to a power supply cable, the heater modules heating the inside of a battery pack having a configuration where a plurality of battery modules are apposed.

BACKGROUND ART

As a heater module for warming the inside of a battery pack in order to adjust the temperature thereof, a heater module set forth in Patent Literature 1 is conventionally known. In Patent Literature 1, a heater module (heater body) tightly contacts the outer side surface of a casing of a battery pack which stores a number of battery modules, and the heater module is attached to the casing of the battery pack by using a heater unit casing. Also, a heat insulating sheet is placed between the surface of the heater module which faces away from the outer side surface of the casing of the battery pack, and the heater unit casing.

CITATION LIST

Patent Literature

Patent Literature 1: Japanese Patent Unexamined Publication No. 2008-186621

SUMMARY OF INVENTION

However, in Patent Literature 1, the battery modules, which are objects to be warmed by the heater module (heater body), are not warmed directly by the heater module. Specifically, the casing of the battery pack which stores the battery modules (objects to be warmed) is warmed by the heater module, and the battery modules are indirectly warmed by heat conduction from the casing of the battery pack to the battery modules. Therefore, there has been a problem that warming efficiency for the battery modules is low.

In order to solve this problem, it is considered to arrange the heater module adjacent to the battery modules and warm the battery modules directly by the heater module. However, in this case, a plurality of the heater modules is required, and in some cases, as many heater modules as battery modules are required.

Incidentally, in the battery pack, all the battery modules are connected to a common power supply cable, and power is fed to each location from the battery modules through the power supply cable. Hence, it is necessary for the plurality of heater modules to be also connected to the power supply cable and receive power from the power supply cable. At this time, the heater modules are usually connected to the power supply cable by crimping individual lead wires thereof to the power supply cable by caulking coupling or the like.

Meanwhile, since crimp connection by caulking coupling or the like is a mechanical coupling connection method, repeated vibration may cause disconnection, and, in this case, the battery modules are no longer warmed by the heater modules. As a result, for example, the battery pack is frozen, power that is able to be inputted and outputted becomes zero, and in the case of a vehicle, driving may no longer be possible. Therefore, it is required to detect whether the crimping connection between the lead wires of the heater modules and the power supply cable is disconnected. The disconnection is determined based on the temperature detected by a temperature sensor, which shows whether there is a normal temperature increase while the heater modules are operated. When the detected temperature is lower than a normal value, it is possible to determine that the lead wires of the heater modules and the power supply cable are disconnected.

However, when the lead wires of the heater modules are individually crimped and connected to the power supply cable as explained above, it is required to provide a temperature sensor for each of the heater modules. Therefore, the same number of temperature sensors as heater modules are needed, thus causing a cost increase.

In order to solve this problem, there is a method where a minimum number of temperature detection points inside of the battery pack are obtained beforehand based on experiments or the like so that disconnection of the heater modules is able to be detected most effectively, and then the temperature sensors are provided at such points. In this case, however, it is impossible to detect disconnection of the crimping connection of the heater module located far from the points where the temperature sensors are installed, thereby causing a problem that the disconnected heater module is not identifiable.

The present invention has been accomplished in view of these problems of the conventional technology. An object of the present invention is to provide a heater module wire connection structure for a battery pack, which ensures that disconnection of a crimping connection is detected and identified even for a heater module, the temperature of which is not able to be detected directly as the heater module is located far from a point where a temperature sensor is installed.

The heater module wire connection structure for a battery pack according to an aspect of the present invention includes a battery pack, and first and second heater modules which warm the inside of the battery pack and have lead wires connected thereto. Further, the heater module wire connection structure includes a power supply cable to which the lead wires of the first and second heater modules are crimped and connected, and a temperature sensor which is placed inside of the battery pack and detects the temperature of the first heater module. The lead wire of the first heater module, the temperature of which is detectable by the temperature sensor, and the lead wire of the second heater module, the temperature of which is not detectable by the temperature sensor, are simultaneously crimped and connected to the same position on the power supply cable.

DESCRIPTION OF EMBODIMENTS

An embodiment of the present invention will be described below based on the drawings. It should be noted that dimensional ratios in the drawings are magnified for convenience of explanation, and may be different from actual ratios.

Figure 1:
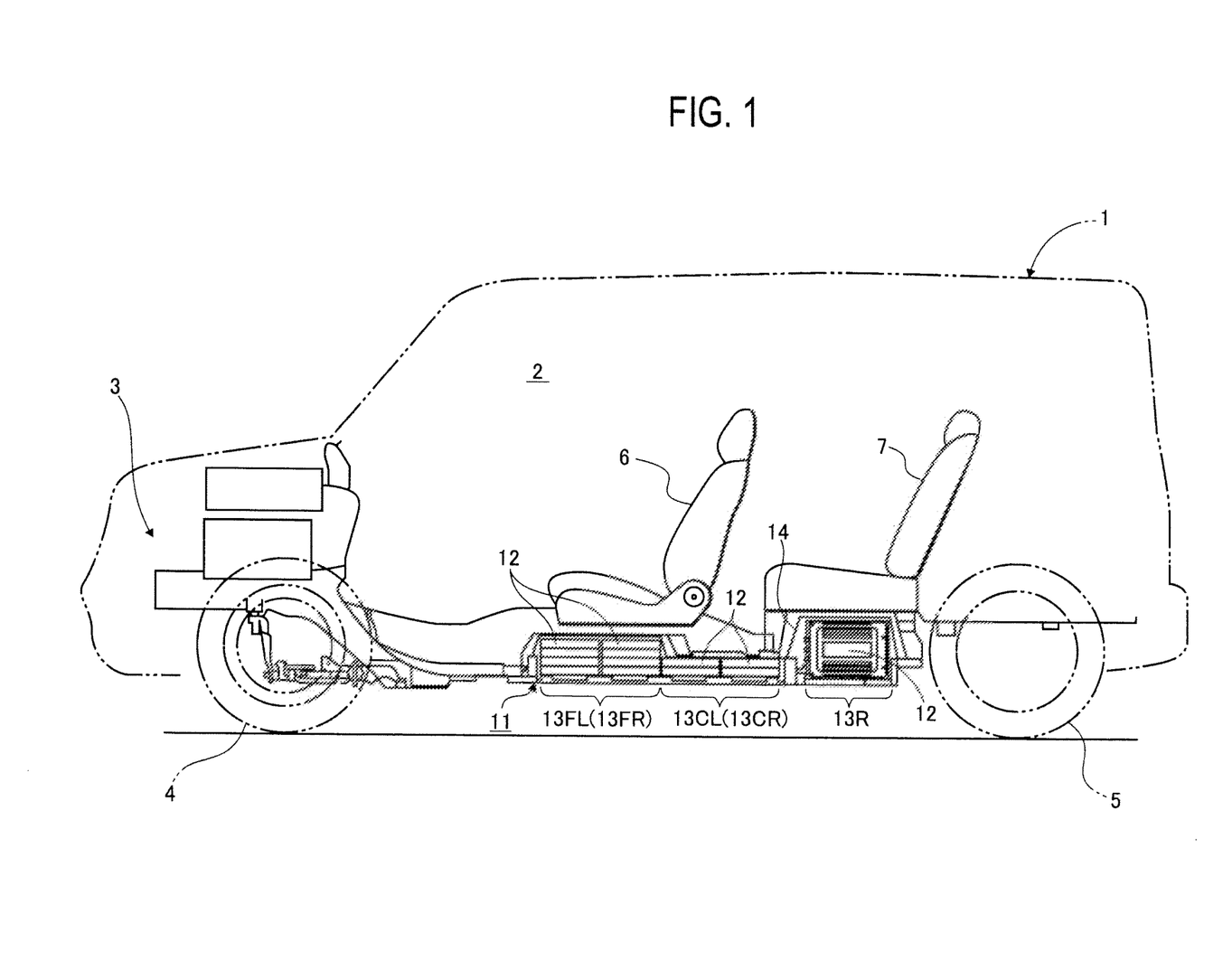
FIG. 1 is a side view showing a state where a battery pack, to which a heater module wire connection structure for a battery pack according to an embodiment of the present invention is applicable, is attached inside of a battery storage space directly beneath a vehicle floor panel.
Figure 2:
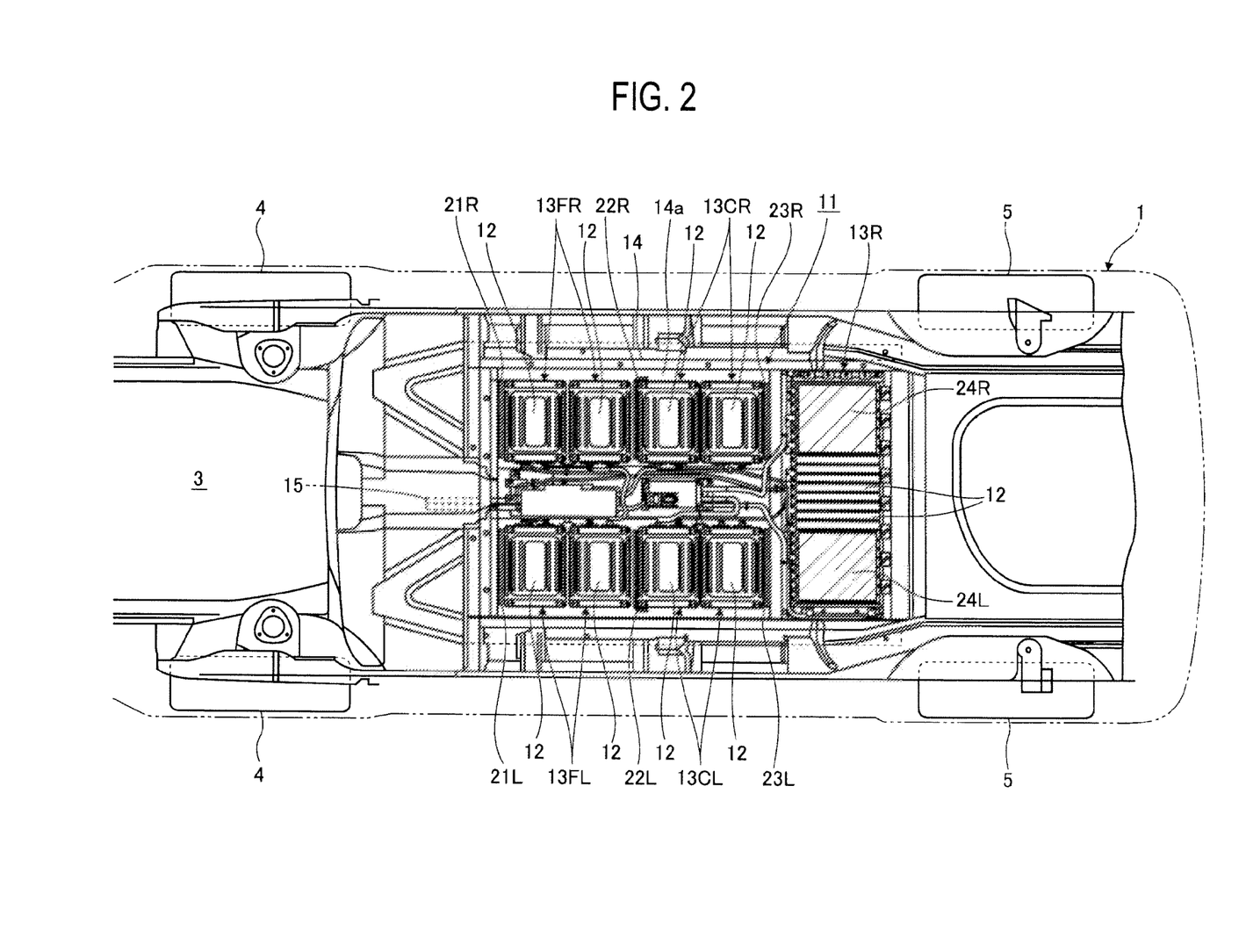
FIG. 2 is a plan view showing a state where the battery pack shown in FIG. 1 is attached inside of the battery storage space.
Figure 3:
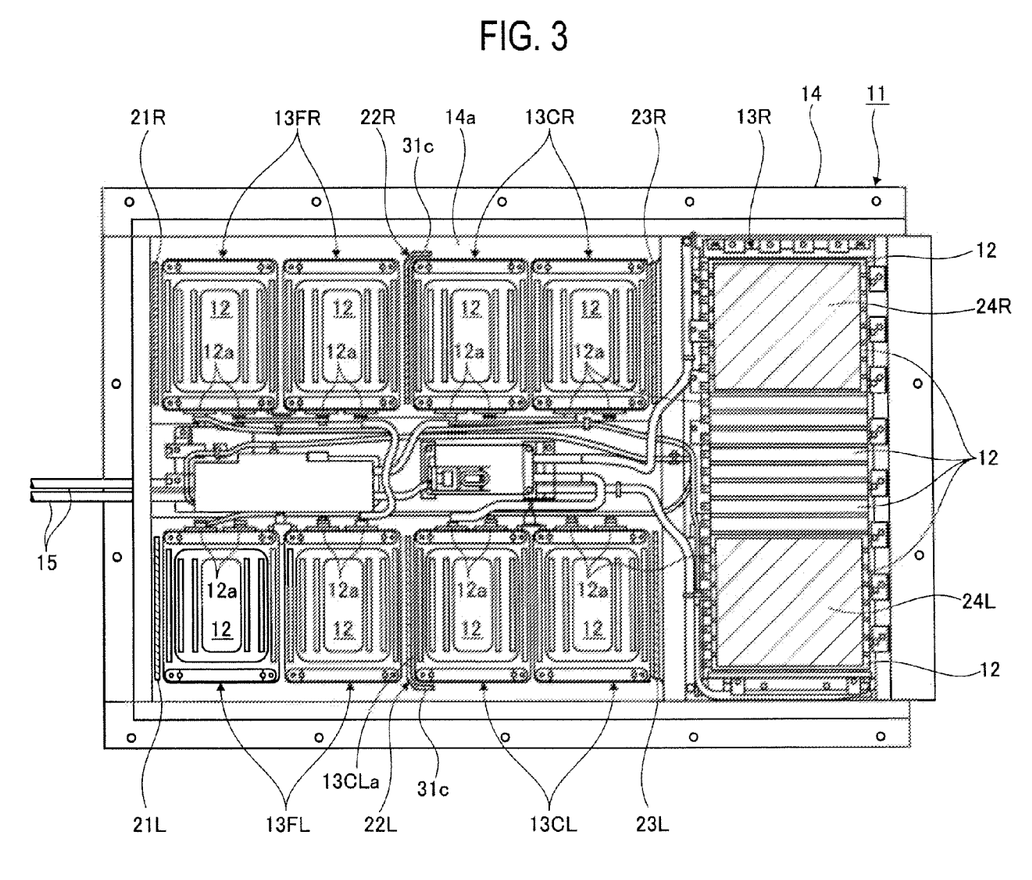
FIG. 3 is a plan view of the entire battery pack, showing a state where the battery pack shown in FIGS. 1 and 2 is removed from the battery storage space.

FIGS. 1 and 2 are a side view and a plan view of a vehicle, showing a state where a battery pack, to which a heater module wire connection structure for a battery pack according to the present embodiment is applicable, is attached inside of a battery storage space directly beneath a vehicle floor panel. FIG. 3 is an overall plan view of the battery pack, showing a state where the battery pack illustrated in FIGS. 1 and 2 is removed from the battery storage space of the vehicle.

[Battery Pack]

First of all, the vehicle battery pack illustrated in FIGS. 1 to 3 will be explained. In FIGS. 1 and 2, reference numeral 1 denotes a vehicle body, reference numeral 2 denotes a vehicle cabin, and reference numeral 3 denotes a motor compartment in which an electric motor for driving is mounted. Further, reference numeral 4 denotes left and right front wheels, reference numeral 5 denotes left and right rear wheels, reference numeral 6 denotes a front seat, reference numeral 7 denotes a rear seat, and reference numeral 11 denotes a vehicle battery pack.

The battery pack 11 includes a plurality of battery modules 13FL, 13FR, 13CL, 13CR, and 13R each of which is made by stacking a number of battery shells 12. As the battery modules 13FL, 13FR, 13CL, 13CR, and 13R are stored in a common battery pack casing 14 as illustrated in FIG. 3, a single unit is configured.

To explain further in detail, the battery modules 13FL on the front left side and the battery modules 13FR on the front right side are provided directly beneath the floor panel provided under the left and right front seats 6, as illustrated in FIGS. 1 and 2. Also, the battery module 13R at the rear is provided directly beneath the floor panel at the left and right rear seats 7. Moreover, the battery modules 13CL on the center left side and the battery modules 13CR on the center right side are provided directly underneath the floor panel that is located under feet in the rear seats and extends between the left and right front seats 6 and the left and right rear seats 7. The battery pack 11 stores and fixes these battery modules in the battery pack casing 14.

As illustrated in FIGS. 1 to 3, in the battery modules 13FL on the front left side, four of the battery shells 12 are stacked in a vertical direction and transversely with respect to the vehicle front-rear direction. Two of the modules, each having four of the battery shells 12, are apposed in the vehicle front-rear direction as a pair. Similarly, in the battery modules 13FR on the front right side, four of the battery shells 12 are stacked in the vertical direction and transversely with respect to the vehicle front-rear direction. Two of the modules, each having four of the battery shells 12, are apposed in the vehicle front-rear direction as a pair.

Further, as shown in FIGS. 1 to 3, in the battery module 13R at the rear, a number of the battery shells 12 are placed longitudinally with respect to the vehicle front-rear direction and stacked in the vehicle width direction. The battery shells 12 in the battery module 13R are stacked so as to have almost the same length as the entire length of the rear seats 7.

Moreover, as shown in FIGS. 1 to 3, in the battery modules 13CL on the center left side, two of the battery shells 12 are placed transversely with respect to the vehicle front-rear direction and stacked in the vertical direction. Two of the modules, each having two of the battery shells 12, are apposed in the vehicle front-rear direction as a pair. Similarly, in the battery modules 13CR on the center right side, two of the battery shells 12 are placed transversely with respect to the vehicle front-rear direction and stacked in the vertical direction. Two of the modules, each having two of the battery shells 12, are apposed in the vehicle front-rear direction as a pair.

As shown in FIG. 3, electrode terminals 12a are provided in the battery shells 12 which form the battery modules 13FL on the front left side and the battery modules 13FR on the front right side. The battery modules 13FL and 13FR are arranged so that the electrode terminals 12a of the battery modules 13FL and the electrode terminals 12a of the battery modules 13FR face each other.

Further, the electrode terminals 12a are also provided in the battery shells 12 which form the battery modules 13CL on the center left side and the battery modules 13CR on the center right side. The battery modules 13CL and 13CR are arranged so that the electrode terminals 12a of the battery modules 13CL and the electrode terminals 12a of the battery modules 13CR face each other.

As illustrated in FIG. 3, the battery module 13R at the rear is arranged so that all of the electrode terminals 12a of the battery shells 12 which form the battery module 13R, face to the front of the vehicle.

As shown in FIGS. 2 and 3, a power supply cable is arranged in the space at the midpoint in the vehicle width direction between the battery modules 13FL and 13FR on the front side, and in the space at the midpoint in the vehicle width direction between the battery modules 13CL and 13CR at the center. The electrode terminals 12a of the battery shells 12 which form each of the battery modules 13FL, 13FR, 13CL, 13CR, and 13R are connected to motor power-supply lines 15 through the power supply cable. The motor power-supply lines 15 are electrically connected to an electric motor and an inverter in the motor compartment 3.

[Heater Module]

Next, heater modules in the battery pack 11 will be explained based on FIGS. 2 and 3. In FIGS. 2 and 3, hatching has been added to the heater modules for convenience of explanation.

The heater modules have functions to warm the battery modules 13FL, 13FR, 13CL, 13CR, and 13R in the battery pack 11 in order to prevent the battery modules from freezing when not in use. In other words, each of the battery modules 13FL and 13FR on the front side have a large heat capacity, as four of the battery shells 12 are stacked therein as explained above. On the contrary, each of the battery modules 13CL and 13CR is made of two stacked battery shells 12, and thus have a small heat capacity, such that the temperature thereof easily decreases. Hence, in this embodiment, the heater modules 21L and 21R are provided only on the front sides of the battery modules 13FL and 13FR, as illustrated in FIGS. 2 and 3. But for the battery modules 13CL and 13CR at the center, the heater modules 22L and 22R are provided on the front sides thereof, and the heater modules 23L and 23R are provided on the rear sides thereof.

Incidentally, in the battery module 13R at the rear, the number of stacked battery shells 12 is larger than that of the battery modules 13FL and 13FR on the front side, and the battery module 13R thus has the largest heat capacity, and a temperature decrease is even more unlikely to happen. Therefore, in the battery module 13R at the rear, the heater modules 24L and 24R are provided above both ends of the battery shells 12 in the stacking direction.

The heater modules 21L and 21R are arranged adjacent to the front sides of the battery modules 13FL on the front left side and the battery modules 13FR on the front right side, respectively, in a vertical state. Also, the heater modules 22L and 22R are arranged adjacent to the front sides of the battery modules 13CL on the center left side and the battery modules 13CR on the center right side, respectively, in a vertical state. Further, the heater modules 23L and 23R are arranged adjacent to the rear sides of the battery modules 13CL on the center left side and the battery modules 13CR on the center right side, respectively, in a vertical state. As explained later, the heater modules 21L, 21R, 22L, 22R, 23L and 23R are attached and fixed to a battery module carrying surface 14a of the battery pack casing 14.

The heater modules 24L and 24R are provided on both ends of the battery module 13R at the rear in the stacking direction of the battery shells. Moreover, the heater modules 24L and 24R are attached and fixed to the top of the stacked battery module 13R, in other words, on a side surface of the stacked battery module 13R.

Incidentally, as explained earlier, the power supply cable is arranged in the space at the midpoint between the battery modules 13FL and 13FR on the front side, and in the space at the midpoint between the battery modules 13CL and 13CR at the center. As described later, the heater module includes a power source connection terminal which electrically connects a plate-like heater body 34 having a plate-like heating element 32 and a heat equalizing plate 33, to the power supply cable. Therefore, it is preferred that the power source connection terminals of the heater modules 21L and 21R be installed on the sides closer to the space at the midpoint between the battery modules 13FL and 13FR on the front side. It is also preferred that the power source connection terminals of the heater modules 22L, 22R, 23L, 23R, 24L and 24R be located on the sides closer to the space at the midpoint between the battery modules 13CL and 13CR at the center.

Accordingly, the power source connection terminals of the heater modules 21L and 21R arranged on the front sides of the battery modules 13FL on the front left side and the battery modules 13FL on the front right side, are located in mutually proximate end portions of the heater modules 21L and 21R. Also, the power source connection terminals of the heater modules 23L and 23R arranged on the rear sides of the battery modules 13CL on the center left side and the battery modules 13CR on the center right side, are located in mutually proximate end portions of the heater modules 23L and 23R. Hence, the heater modules 21L and 21R, and the heater modules 23L and 23R are able be formed into a plate shape.

As illustrated in FIG. 3, there is no neighboring battery module on the front sides of the battery modules 13FL and 13FR. Therefore, it is possible to secure spaces for placing the power source connection terminals in the peripheries of the mutually proximate end portions of the heater modules 21L and 21R, and this enables the power source connection terminals of the heater modules 21L and 21R to be arranged as explained above. Similarly, there is no neighboring battery module at the rear of the battery modules 13CL and 13CR. Therefore, it is possible to secure spaces for placing the power source connection terminals in the peripheries of the mutually proximate end portions of the heater modules 23L and 23R, and this enables the power source connection terminals of the heater modules 23L and 23R to be arranged as explained above.

On the other hand, the battery modules 13FL on the front left side and the battery modules 13FR on the front right side are arranged next to the vehicle front sides of the battery modules 13CL on the center left side and the battery modules 13CR on the center right side, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR at the center.

Figure 4:
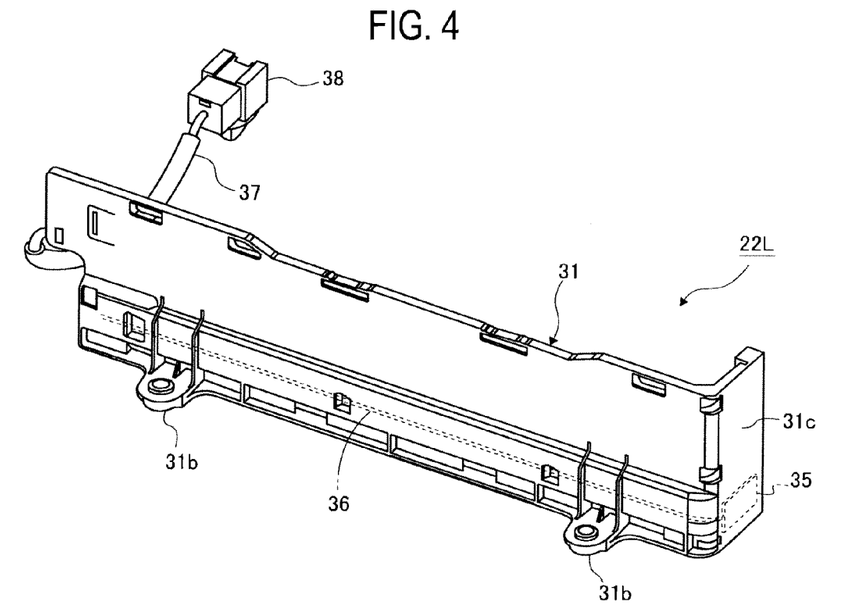
FIG. 4 is a perspective view illustrating a heater module used for the battery pack shown in FIGS. 2 and 3.
Figure 5:
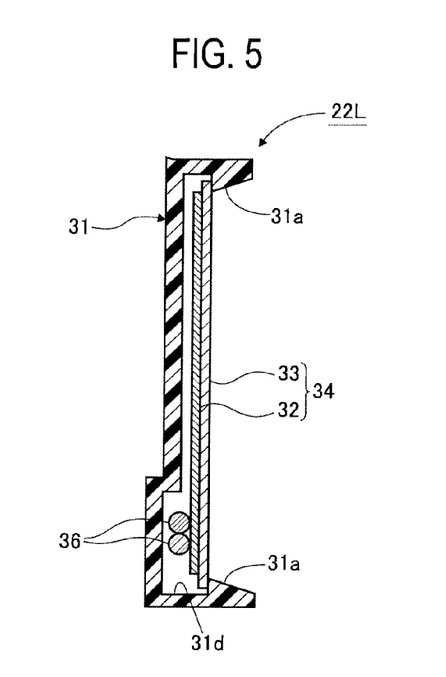
FIG. 5 is a sectional view showing the heater module illustrated in FIG. 4.

Therefore, in this embodiment, the heater modules 22L and 22R arranged in the standing state on the front sides of the battery modules 13CL and 13CR at the center have a configuration depicted in FIGS. 4 and 5. FIG. 4 is a perspective view showing the entire heater module 22L, and FIG. 5 is a longitudinal sectional view of the heater module 22L. As illustrated in FIGS. 4 and 5, the heater module 22L is formed of an insulating holder 31 made of an insulating material such as a resin, and the plate-like heater body 34 made by sticking the plate-like heating element 32 and the heat equalizing plate 33 together. The plate-like heating element 32 is a conductor which generates Joule heat by allowing an electric current from the power supply cable to pass therethrough. The heat equalizing plate 33 is a plate-like body which equally transfers heat generated by the plate-like heating element 32 to the battery modules Then, as shown in FIG. 5, the plate-like heater body 34 is placed along one side surface of the insulating holder 31. In this case, the plate-like heating element 32 of the plate-like heater body 34 is located on the side closer to the insulating holder 31, and the heat equalizing plate 33 is located so as to be exposed on the side away from the insulating holder 31. A plurality of engaging portions 31a for the heater body, each of which are able to be a snap-fit type, is provided in edge portions of the insulating holder 31. With these engaging portions 31a, the plate-like heater body 34 is able to be engaged with the insulating holder 31 in the above-mentioned layout. Then, due to the engagement state, it is possible to form a layer of air between the insulating holder 31 and the plate-like heating element 32.

The heater module 22L having the foregoing configuration is provided with lugs 31b at the bottom side of the insulating holder 31, as illustrated in FIG. 4. The heater module 22L is attached in the standing state onto the battery module carrying surface 14a of the battery pack casing 14 through these lugs 31b. At this time, as illustrated in FIG. 3, the heater module 22L is attached so that the heat equalizing plate 33 of the plate-like heater body 34 proximately faces front side surfaces 13CLa of the battery modules 13CL.

Incidentally, as explained above, the battery modules 13FL and 13FR on the front side are arranged immediately next to the vehicle front sides of the battery modules 13CL and 13CR at the center, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR.

Therefore, in this embodiment, the insulating holders 31 of the heater modules 22L and 22R are bent as illustrated in FIG. 4. In other words, the end portions 31c of the heater modules 22L and 22R which are towards the vehicle side are bent along corner portions of the corresponding battery modules 13CL and 13CR.

Then, as depicted in FIG. 3, the bent end portions 31c of the insulating holders 31 are located outside of the region holding the corresponding battery modules 13CL on the center left side and the battery modules 13CR on the center right side. Normally, an extra space is made outside of the region which holds the battery modules 13CL on the center left side and the battery modules 13CR on the center right side, for safety reasons at the time of a side impact crash of another vehicle. Therefore, it is possible to place the bent end portions 31c of the insulating holders 31 in this space.

As shown in FIG. 4, the power source connection terminal of the heater module 22L, that is the power source connection terminal 35 connected to the plate-like heater body 34, is provided on the inner side of the bent end portion 31c of the insulating holder 31. Then, as shown in FIG. 5, a heater harness 36 extending from the power source connection terminal 35 is stored in a harness cabling groove 31d provided in the insulating holder 31. Further, as shown in FIG. 4, the heater harness 36 is extended to the opposite end of the insulating holder 31 where the end portion of the heater harness 36 is connected to a lead wire 37 provided in the end portion of the insulating holder 31.

Moreover, a connector 38 is provided in the distal end of the lead wire 37. This connector 38 is electrically connected to the power supply cable that is arranged in a space at the midpoint in the vehicle width direction as explained above. Thus, an electric current is fed from the power source 41 to the heater module 22L, in other words, to the plate-like heating element 32 of the plate-like heater body 34.

It could be considered that the power source connection terminal 35 of the plate-like heater body 34 is arranged at the midpoint of the insulating holder 31 in a longitudinal direction, and is placed between the insulating holder 31 and the plate-like heating element 32. In this case, however, the thickness of the heater module 22L is increased, and the heater module 22L cannot be inserted into the limited space between the battery modules 13CL on the center left side and the battery modules 13FL on the front left side.

[Heater Module Wire Connection Structure]

Next, a wire connection structure of the heater modules 21L, 21R, 22L, 22R, 23L, 23R, 24L and 24R will be described based on FIG. 6.

Figure 6:
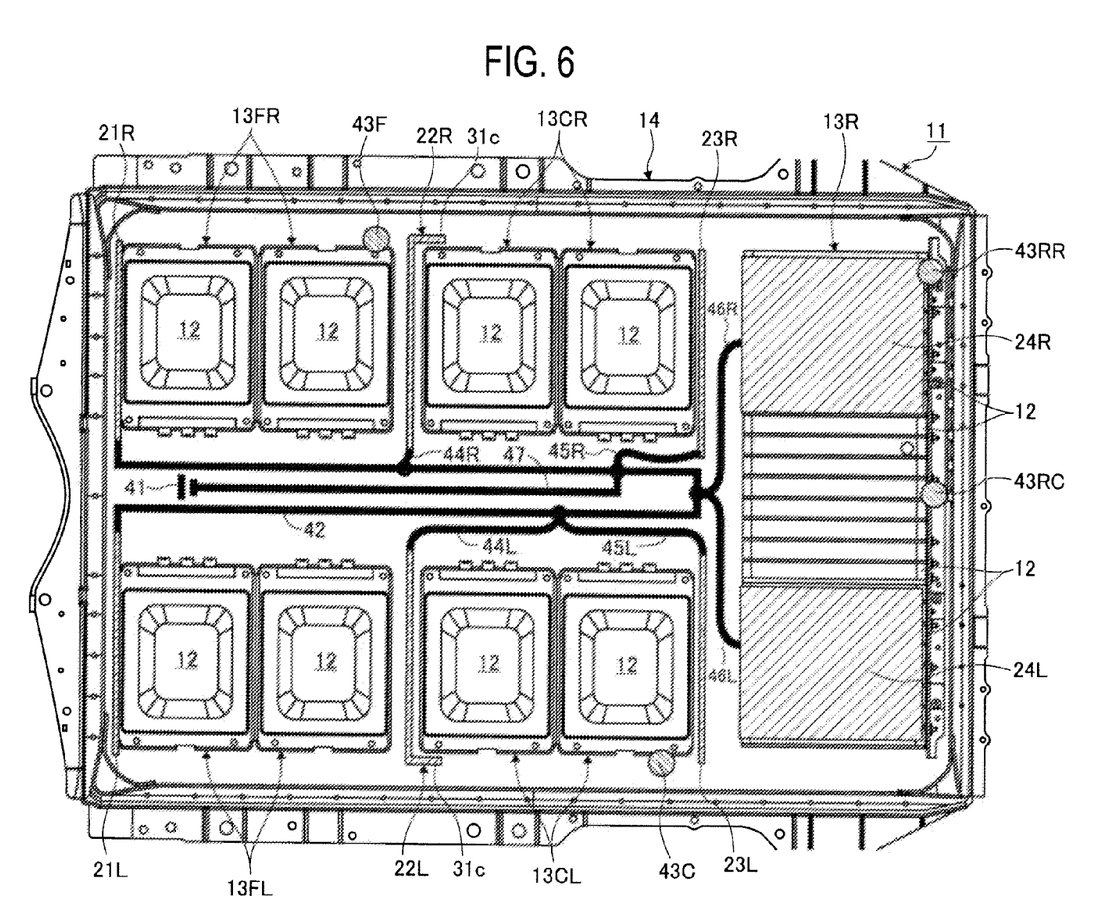
FIG. 6 is a plan view schematically showing the wire connection structure of the heater modules illustrated in FIGS. 2 and 3, with respect to a power supply cable.

FIG. 6 is a schematic plan view showing the battery pack 11 together with the heater module wire connection structure. In FIG. 6, reference numeral 41 denotes the power source within the battery pack 11 for feeding electric power to the heater modules. Reference numeral 42 denotes the common power supply cable to which the heater modules 21L, 21R, 22L, 22R, 23L, 23R, 24L and 24R are connected.

As describe above, the power supply cable 42 is arranged in the space at the midpoint between the battery modules 13FL and 13FR on the front side in the vehicle width direction, and in the space at the midpoint between the battery modules 13CL and 13CR at the center in the vehicle width direction. The heater modules 21L, 21R, 22L, 22R, 23L, 23R, 24L and 24R are connected to the power supply cable 42 through the lead wires.

When electric connection between the heater modules 21L, 21R, 22L, 22R, 23L, 23R, 24L, or 24R, and the power supply cable 42 is disconnected, the corresponding heater module is no longer electrified. As a result, it becomes impossible to warm the corresponding battery module, and the aim to install the heater modules cannot be achieved. Therefore, it is necessary to detect the connection state between the heater modules and the power supply cable 42. Thus, in this embodiment, a plurality of temperature sensors 43F, 43C, 43RR and 43RC are provided at given locations within the battery pack 11. In FIG. 6, there are four temperature sensors installed. When the temperature detected by these temperature sensors does not show a normal increase even when the heater modules are operating, it is determined that the electrical connection between the heater module and the power supply cable is disconnected. The state where the electrical connection between the heater module and the power supply cable is disconnected will also be referred to as "disconnection" hereinbelow.

For the temperature sensors 43F, 43C, 43RR and 43RC, a widely known sensor such as a thermistor may be used, and installation locations thereof are decided as follows. Specifically, a minimum number of temperature detection points within the battery pack 11 are obtained from experiments or the like, by which disconnection of the heater modules from the power supply cable is detected most effectively. For example, the top four locations in the battery pack 11 are obtained from experiments, where a temperature decrease is most likely to happen due to disconnection of the heater modules. Then, the temperature sensors 43F, 43C, 43RR and 43RC are installed only at the obtained temperature detection points.

In FIG. 6, the temperature sensor 43F is arranged adjacent to the outer end of the heater module 22R in the vehicle width direction. Also, the temperature sensor 43C is arranged adjacent to the outer end of the heater module 23L in the vehicle width direction. Further, the temperature sensor 43RR is arranged at the rear of the heater module 24R in the vehicle front-rear direction. The temperature sensor 43RC is arranged between the heater modules 24L and 24R.

Since the temperature sensors 43F, 43C, 43RR and 43RC are arranged as stated above, it is possible to detect disconnection of the heater modules 22R, 23L, and 24R located near the temperature sensors based on the fact that temperatures detected by the temperature sensors 43F, 43C, 43RR do not increase normally. However, the rest of the heater modules 21L, 21R, 22L, 23R and 24L are located away from any of the temperature sensors 43F, 43C, 43RR and 43RC. Therefore, temperatures detected by the temperature sensors do not show a significant decrease even if the heater modules 21L, 21R, 22L, 23R or 24L are disconnected.

However, in this embodiment, it is possible to detect disconnection of the heater modules even for the heater modules 21L, 21R, 22L, 23R and 24L which are located far from any of the temperature sensors 43F, 43C, 43RR and 43RC, and temperatures of which are not detectable by the temperature sensors. In order to make it possible to identify a disconnected heater module, the wire connection structure to the power supply cable explained below, is used.

Among the heater modules which are far from any of the temperature sensors and temperatures of which are unable to be detected by the temperature sensors, the lead wire 44L of the heater module 22L is simultaneously crimped and connected together with the lead wire 45L of the heater module 23L to the same position on the power supply cable 42. The temperature of the heater module 23L is able to be detected by the temperature sensor 43C as illustrated in FIG. 6. An example of a method for crimping and connecting the lead wire 44L and the lead wire 45L to the power supply cable 42 is a method using caulking. The lead wire 44L is connected to the connector 38 shown in FIG. 4. Similarly, the lead wire 45L is also connected to the heater module 23L through a non-illustrated connector.

The lead wire 46L of the heater module 24L, the temperature of which is undetectable, is crimped and connected together with the lead wire 46R of the heater module 24R, the temperature of which is detectable by the temperature sensor 43RR to the same position on the power supply cable 42. Furthermore, the lead wire 45R of the heater module 23R, the temperature of which is undetectable, is crimped and connected together with the lead wire 47 from the power source 41 to the same position on the power source cable 42.

For the remaining heater modules with temperatures which are undetectable, the lead wires of the heater modules 21L and 21R are inserted into and directly connected to a channel of the power supply cable 42, instead of being mechanically crimped and connected thereto as explained above. The lead wire 44R of the heater module 22R, the temperature of which is detectable by the temperature sensor 43F, is singly crimped and connected to the power supply cable 42.

Figure 7:
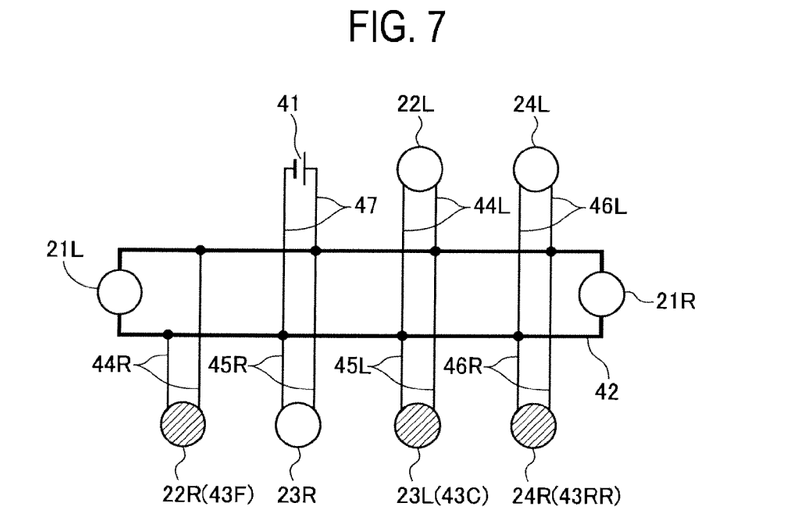
FIG. 7 is an electrical circuit diagram showing the heater module wire connection structure in FIG. 6 as an electrical circuit.

FIG. 7 shows the heater module wire connection structure according to the foregoing embodiment as an electric circuit. In FIG. 7, temperatures of the heater modules 22R, 23L, and 24R indicated by hatched circle marks are able to be detected by the temperature sensors 43F, 43C, and 43RR, respectively. The heater modules 21L, 21R, 22L, 23R and 24L indicated by circle marks without hatching are far from any of the temperature sensors 43F, 43C, 43RR and 43RC, and temperatures thereof are undetectable by the temperature sensors.

Effects of the Embodiment

Effects of the heater module wire connection structure according to the present embodiment described above will be explained based on FIGS. 7 and 8.

Figure 8:
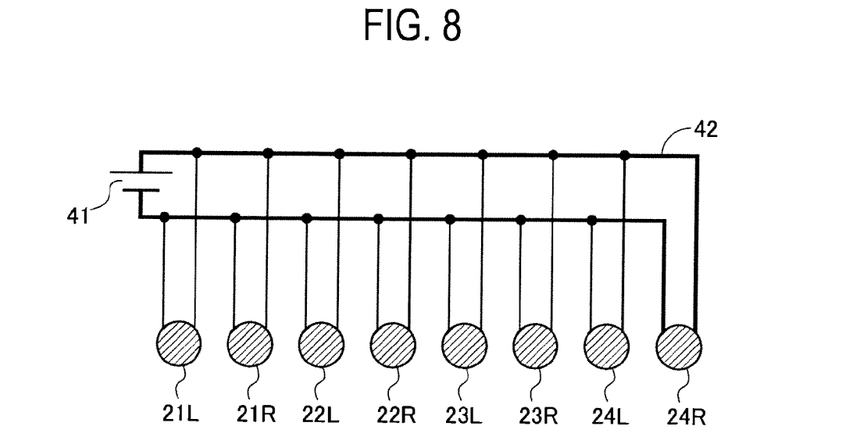
FIG. 8 is an electrical circuit diagram showing a heater module wire connection structure with respect to a power supply cable in the conventional technology, as an electrical circuit.

First of all, an explanation will be given with regard to a wire connection structure and problems thereof in the case of connecting the heater modules 21L, 21R, 22L, 22R, 23L, 23R, 24L and 24R to the power supply cable 42 without any consideration. In the case of a wire connection structure of the heater modules to the power supply cable 42 without any consideration, the circuit configuration illustrated in FIG. 8 is conceived. Specifically, the heater modules 21L, 21R, 22L, 22R, 23L, 23R, 24L and 24R are crimped and connected in parallel to the power supply cable 42.

However, in this case, as many temperature sensors as heater modules are necessary in order to detect disconnection of the crimping connection of all the heater modules 21L, 21R, 22L, 22R, 23L, 23R, 24L and 24R from the power supply cable 42. Therefore, in this example, 8 temperature sensors are necessary and this poses a considerable cost disadvantage. Further, in the case where the temperature sensors 43F, 43C, 43RR and 43RC are simply installed in the battery pack casing as detailed in this embodiment, the heater modules 21L, 21R, 22L, 23R and 24L are located away from the temperature sensors, and the temperatures thereof are not detectable. Hence, in the case of the circuit configuration shown in FIG. 8, it is impossible to detect whether the crimping connection of the heater modules 21L, 21R, 22L, 23R and 24L to the power supply cable 42 has been disconnected.

On the contrary, in the heater module wire connection structure according to this embodiment, the lead wire 44L of the heater module 22L is simultaneously crimped and connected together with the lead wire 45L of the heater module 23L to the same position on the power supply cable 42. The heater module 22L is located away from any of the temperature sensors 43F, 43C, 43RR and 43RC, and the temperature thereof is not detectable. However, the temperature of the heater module 23L is able to be detected by the temperature sensor 43C.

In such a configuration, when the crimping connection of the lead wire 44L of the heater module 22L, the temperature of which is undetectable, is disconnected from the power supply cable 42, the crimping connection of the lead wire 45L of the heater module 23L, the temperature of which is detectable, is also disconnected from the power supply cable 42. Therefore, the temperature detected by the temperature sensor 43C in the vicinity of the heater module 23L that is disconnected from the power supply cable does not show a normal temperature increase. Thus, it is found that the lead wire 44L of the heater module 22L is disconnected from the power supply cable 42.

As explained above, it is ensured that the disconnection from the power supply cable 42 of the lead wire 44L of the heater module 22L, the temperature of which is not detectable by the temperature sensor, is detected through the temperature sensor 43C, and the disconnection is dealt with easily.

The lead wire 46L of the heater module 24L is simultaneously crimped and connected to the same position of the power supply cable 42 with the lead wire 46R of the heater module 24R, the temperature of which is able to detected by the temperature sensor 43RR. When the lead wire 46L of the heater module 24L, the temperature of which is not detectable, is disconnected from crimping connection to the power supply cable 42, the lead wire 46R of the heater module 24R, the temperature of which is detectable, is also disconnected from crimping connection to the power supply cable 42. Therefore, it is found that the lead wire 46L of the heater module 24L is disconnected from the power supply cable 42, through the temperature sensor 43RR.

Further, the lead wire 45R of the heater module 23R, the temperature of which is not detectable, is simultaneously crimped and connected with the lead wire 47 from the power source 41 to the same position on the power supply cable 42. Therefore, when the crimping connection to the lead wire 45R of the heater module 23R, the temperature of which is not detectable, is disconnected from the power supply cable 42, the crimping connection of the lead wire 47 from the power source 41 is also disconnected from the power supply cable 42. Therefore, all of the heater modules are no longer energized, and temperatures detected by all of the temperature sensors 43F, 43C, 43RR and 43RC do not show a normal temperature increase. Hence, the disconnection from the power supply cable 42 of the lead wire 45R of the heater module 23R, connected together with the lead wire 47 from the power source 41 to the power supply cable 42, is detected.

As explained above, it is ensured that the disconnection from the power supply cable 42 of the lead wire 45R of the heater module 23R, the temperature of which is not detectable by the temperature sensor, is detected through all of the temperature sensors 43F, 43C, 43RR and 43RC, and the disconnection is dealt with easily.

Further, the lead wires of the heater modules 21L and 21R, the temperatures of which are undetectable, are inserted into and directly connected to the channel of the power supply cable 42, instead of mechanical crimping connection through the lead wires. Therefore, even though the temperatures of the heater modules 21L and 21R are not detectable, the heater modules 21L and 21R are not mechanically crimped and connected to the power supply cable 42, and are thus not disconnected from the power supply cable 42, thereby causing no problem.

The lead wire 44R of the heater module 22R, the temperature of which is detectable by the temperature sensor 43F, is singly crimped and connected to the power supply cable 42. However, when the lead wire 44R is disconnected from the power supply cable 42, the disconnection is immediately detected from the temperature detected by the temperature sensor 43F, and can be dealt with instantly.

As explained so far, according to the wire connection structure of this embodiment, even when there are only four temperature sensors 43F, 43C, 43RR and 43RC, it is possible to detect whether the crimping connection of all of the eight heater modules is disconnected. As a result, the number of the temperature sensors installed is able to be decreased by half, which is considerably advantageous for reductions of weight and costs.

Hence, the wire connection structure according to this embodiment includes a battery pack, and first and second heater modules which warm inside of the battery pack and have lead wires connected thereto. Further, the wire connection structure includes a power supply cable to which the lead wires of the first and second heater modules are crimped and connected, and a temperature sensor which is placed inside of the battery pack and detects the temperature of the first heater module. Then, the lead wire of the first heater module, the temperature of which is detectable by the temperature sensor, and the lead wire of the second heater module, the temperature of which is not detectable by the temperature sensor, are simultaneously crimped and connected to the same position on the power supply cable. As a result, when the lead wire of the first heater module is disconnected from the power supply cable, the lead wire of the second heater module is also disconnected simultaneously, thereby making it possible to detect that both of the first and second heater modules are disconnected, through the single temperature sensor.

The wire connection structure according to this embodiment further includes a third heater module, the temperature of which is not detectable by the temperature sensor. The lead wire of the third heater module is crimped and connected to a position within the battery pack, which is the same as the position where the power source and the power supply cable are crimped and connected to each other. As a result, when the lead wire connecting to the power source is disconnected from the power supply cable, the lead wire of the third heater module is also disconnected simultaneously. Since the lead wire connecting to the power source is disconnected, all of the heater modules are no longer energized, and a temperature decrease is detected by all of the temperature sensors. As a result, it becomes possible to detect that there is disconnection of the third heater module which is connected to the same position as the power source.

Moreover, the wire connection structure according to this embodiment also includes a fourth heater module, the temperature of which is not detectable by the temperature sensor, and the lead wire of the fourth heater module is inserted into and directly connected to a channel of the power supply cable. Therefore, the lead wire of the fourth heater module is immune from disconnection.

In the wire connection structure according to this embodiment, the battery pack is configured by apposing the plurality of battery modules. Further, the first and second heater modules warm surfaces of the battery modules. From among the plurality of the battery modules, the temperature sensors detect the temperature of a battery module which is likely to have a temperature decrease when the first and second heater modules are disconnected from the power supply cable. As a result, accuracy of temperature detection by the temperature sensors is enhanced, thus enabling to ensure detection of disconnection of the first and second heater modules.

The entire content of Japanese Patent Application No. P2011-054085 (filed on Mar. 11, 2011) is herein incorporated by reference.

Although the present invention has been described above by reference to the embodiments and the example, the present invention is not limited to these, and it will be apparent to those skilled in the art that various modifications and improvements can be made.

INDUSTRIAL APPLICABILITY

In the wire connection structure according to the present invention, the lead wire of a heater module, the temperature of which is not detectable by the temperature sensor, and the lead wire of a heater module, the temperature of which is detectable by the temperature sensor, are crimped and connected to the same position on the power supply cable. When the lead wire of the heater module, the temperature of which is not detectable, is disconnected from the power supply cable, the lead wire of the heater module, the temperature of which is detectable, is also disconnected. Therefore, the temperature detected by the temperature sensor does not show a normal temperature increase.

Due to this phenomenon, disconnection of the plurality of heater modules crimped and connected to the power supply cable is discovered. Hence, when the heater module, the temperature of which is not detectable, is disconnected, the disconnection is easily identified and dealt with easily.

REFERENCE SIGNS LIST

11 Battery pack
13FL, 13FR, 13CL, 13CR, 13R Battery modules
21L, 21R, 22L, 22R, 23L, 23R, 24L, 24R Heater modules
41 Power source
42 Power supply cable
43F, 43C, 43RR, 43RC Temperature sensors
44L, 44R, 45L, 45R, 46L, 46R, 47 Lead wires

The invention claimed is:

1. A heater module wire connection structure for a battery pack, comprising:
    a battery pack;
    first and second heater modules which warm an inside of the battery pack and comprise lead wires connected thereto;
    a power supply cable to which a lead wire of the first heater module and a lead wire of the second heater module are crimped and connected; and
    a temperature sensor which is placed inside of the battery pack and detects a temperature of the first heater module,
    wherein the lead wire of the first heater module, a temperature of which is detectable by the temperature sensor, and the lead wire of the second heater module, a temperature of which is not detectable by the temperature sensor, are simultaneously crimped and connected to a same position on the power supply cable.

2. The heater module wire connection structure for the battery pack according to claim 1, further comprising
    a third heater module, a temperature of which is not detectable by the temperature sensor,
    wherein a lead wire of the third heater module is crimped and connected to a position which is the same as a position where a power source and the power supply cable are crimped and connected to each other within the battery pack.

3. The heater module wire connection structure for the battery pack according to claim 1, further comprising
    a fourth heater module, a temperature of which is not detectable by the temperature sensor,
    wherein a lead wire of the fourth heater module is inserted into and directly connected to a channel of the power supply cable.

4. The heater module wire connection structure for the battery pack according to claim 1, wherein
    the battery pack is made by apposing a plurality of battery modules, the first and second heater modules warm surfaces of the battery modules, and the temperature sensor detects, from among the plurality of battery modules, a temperature of a battery module which is likely to have a temperature decrease when the first and second heater modules are disconnected from the power supply cable.

5. The heater module wire connection structure for the battery pack according to claim 1, wherein the lead wire of the first heater module and the lead wire of the second heater module are configured such that when the lead wire of the second heater module is disconnected, the lead wire of the first heater module is also disconnected.

* * * * *